Sept. 18, 1962 W. HAUSMANN 3,054,644
VEHICLE TRACK
Filed Nov. 18, 1959 2 Sheets-Sheet 1

Werner Hausmann
INVENTOR.

BY
AGENT.

Sept. 18, 1962　　　W. HAUSMANN　　　3,054,644
VEHICLE TRACK

Filed Nov. 18, 1959　　　　　　　　　　2 Sheets-Sheet 2

Werner Hausmann
*INVENTOR.*

BY

*Karl F. Ross*
AGENT.

United States Patent Office 3,054,644
Patented Sept. 18, 1962

3,054,644
VEHICLE TRACK
Werner Hausmann, Uthleben, Nordhausen, Germany, assignor to VEB Schlepperwerk Nordhausen, Nordhausen, Harz, Germany, a corporation of Germany
Filed Nov. 18, 1959, Ser. No. 853,880
Claims priority, application Germany Nov. 24, 1958
6 Claims. (Cl. 305—35)

My present invention relates to tracks for vehicles of the type used on agricultural tractors, bulldozers and the like, in regions where land-working machinery having increased traction is desired; and, more particularly, to vehicle tracks adapted to be used in conjunction with track attachments for trackless vehicles (e.g. wheeled agricultural tractors).

Vehicle tracks in use heretofore have generally comprised continuous rubber belts, resilient metal bands and the like adapted to be passed around two or more rollers or wheels. The rubber-belt tracks were formed hitherto of one or more rubber belts provided on their outer faces with ground-gripping cleats adapted to engage the terrain with portions of large surface area in order to propel the vehicle. The inner faces of the rubber belts were provided with teeth adapted to be engaged by drive sprockets or by the wheels of a trackless vehicle to which they may be attached. These teeth and grippers, composed of materials having relatively low wear resistance, tended to deteriorate under the influence of friction and distending forces acting thereon, thus necessitating the frequent replacement of the entire band length. The flexible metal tracks, comprising steel cleats or grippers on their outer sides and sprocket-engaging teeth upon their inner sides, were found to be weakened considerably by the bores provided therein for the riveting or bolting of the cleats and teeth. Tracks of this type were found to rupture along the band at the bolting or riveting points, thereby usually requiring the replacement of the entire flexible strip.

My present invention has as an object, therefore, the provision of a relatively simple vehicle track possessing great strength and wear resistance, requiring a minimum of maintenance, and otherwise obviating the abovementioned difficulties.

In accordance with a feature of the invention, I provide a vehicle track comprising a pair of spaced-apart, endless flexible elements (e.g. V-belts) of high tensile strength carrying a plurality of ground-gripping cleats removably spaced along the flexible elements. The gripper members are provided with an inner surface adapted to be frictionally engaged by a driving wheel such as the rear wheel of a trackless tractor or the like.

According to another feature of the invention, I provide guide elements at either side of the gripper members to center the latter upon the drive wheel and one or more idler wheels.

Still another feature of the invention resides in the provision of belt-clamping means for securing the gripper members to the flexible elements so that the latter are surrounded by the securing means rather than penetrated thereby in order to prevent the weakening of these elements. The belt-clamping means, according to a more specific feature of the invention, may form part of the guide elements removably secured to the gripper members.

The above and other objects, features and advantages of the instant invention will become more readily apparent from the following detailed description, reference being made to the accompanying drawing in which.

Figure 1:
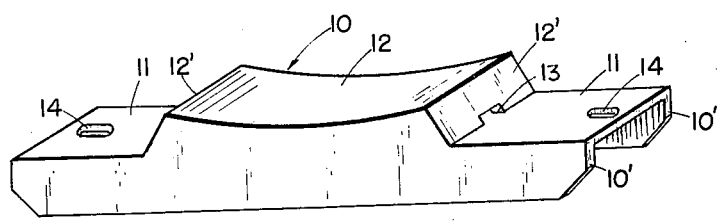
FIG. 1 is a perspective view of a gripper member according to the invention.
Figure 2:
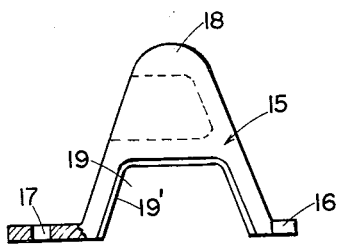
FIG. 2 is a front-elevational view, partly in section, of a guide element adapted to be used in conjunction with the gripper member of FIG. 1.
Figure 3:
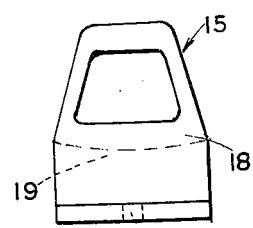
FIG. 3 is a side-elevational view of the guide element of FIG. 2.
Figure 4:
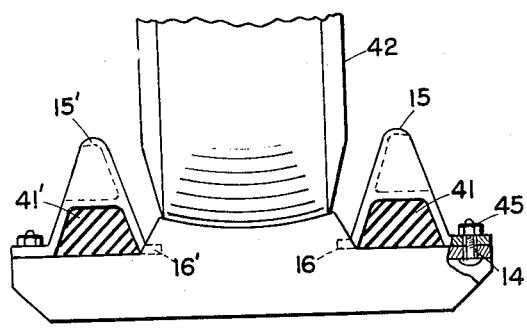
FIG. 4 is a somewhat schematic side-elevational view of a vehicle track incorporating the gripper member of FIG. 1 and the guide element of FIGS. 2 and 3.
Figure 5:
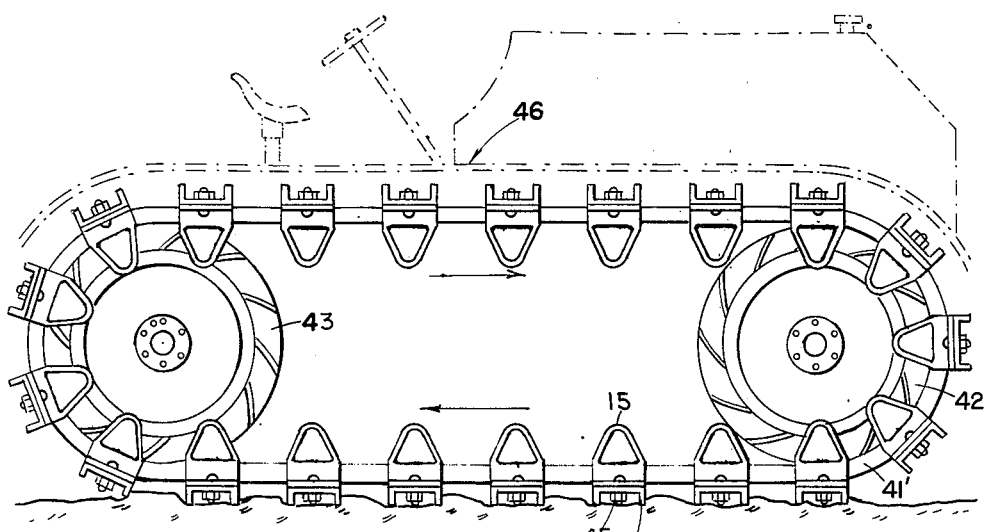
FIG. 5 is a cross-sectional detail view of the track illustrated in FIG. 4.

In FIGS. 1–5 I show a gripper member 10, comprising a pair of ground-gripping cleats 10', lower step portions 11 at each end of member 10, and a raised concave platform 12 adapted frictionally to engage a drive wheel 42 (FIGS. 4, 5). The platform 12 is provided with side walls 12'. The lower stepped portions 11 are formed with holes 14, the walls 12' being provided with horizontal slots 13. The slots 13 are adapted to receive the tongues 16, 16' of a pair of guide elements 15, 15', one of which is shown in FIGS. 2 and 3. The guide elements 15, 15', of generally tapered configuration, are provided with outer legs formed with bores 17 alignable with the holes 14 of the lower stepped portions 11, whereby bolts 45 or rivets may be passed therethrough (as best seen in FIG. 5) in order to secure the guide elements 15, 15', whose inner legs have tongues 16 inserted into slots 13 to the gripper member 10. The guide elements 15, 15', having a surface facing the side walls of one or more wheels 42 and adapted to bear upon the latter to maintain the track upon the wheels, is further provided with a partially enclosed channel 19 so dimensioned that the lower stepped portions 11 complete the enclosure when the guide elements are assembled together with the gripper member 10. Channel 19 has here been illustrated as trapezoidal to conform to the cross-sectional configuration of V-belts 41, 41', e.g. of rubber, which are used as the endless flexible elements in the embodiment shown; this channel may, of course, be of any configuration conforming to the particular type of belt employed. Channel 19 snugly envelops the flexible V-belts, which are clamped between the elements 10 and 15 by the bolts 45. As shown in FIGS. 4 and 5, the gripper members 10 spaced along the V-belts 41, 41' form therewith a track for a tractor schematically illustrated by dot-dash lines 46. The cleats 10' of members 10 run transverse to the direction of travel of the belt indicated by the arrows. The track is driven by wheels 42, 43 whose surfaces are in frictional contact with the arcuate inner surface 12 of each gripper member 10. The elements 15 are provided with concave upper portions 18 in order to increase the wheel-guiding surface without material addition of weight; their surfaces 19', bearing upon the upper face of the belts 41, 41', are slightly convex (as best seen in FIG. 3) to roll on these belts so as to facilitate their looping about the wheels 42, 43 while minimizing the wear of the belt faces.

Figure 6:
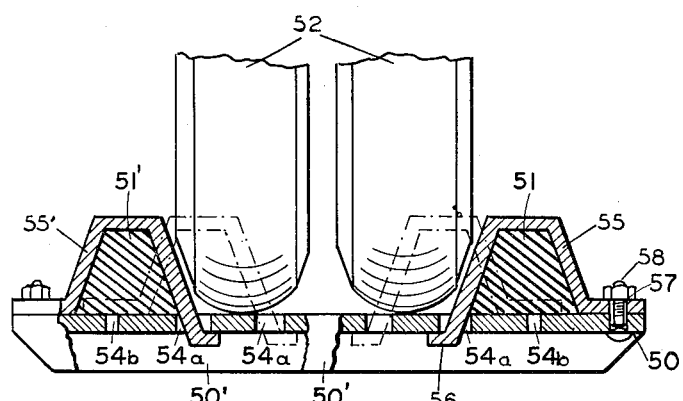
FIG. 6 is a front-elevational view, partly in section, similar to FIG. 5 and illustrating a second embodiment of the invention.

In FIG. 6 I show a second embodiment of my invention comprising a substantially flat gripper member 50 having cleats 50', this member being provided with eight holes 54a, 54b (two pairs of each) spaced along the width thereof. The holes 54a are adapted to receive the tongues 56 on the extended inner legs of guide elements 55, 55', similar to elements 15, 15', while the bores 54b are designed to be aligned with the bores 7 on the fore-shortened outer legs of these guide elements for traversal by bolts 58. The guide elements may be laterally adjusted on member 50, as for example by displacement to the dotdash position shown. In their outermost position they may serve as guide elements for a pair of wheels 52 of a double-wheel drive, while in the dot-dash position the track may be adjusted for single-wheel drive. The guide elements 55, 55' and the gripper member 50 bracket the V-belts 51, 51' between them in a manner identical with that described with reference to the preceding embodiments. It will be readily apparent that the gripper members 10 and 50, as well as the guide elements 15, 15' and 55, 55', may be conveniently replaced without removing the belts 41, 41' or 51, 51' from the tracks.

The above and other modifications and variations, readily apparent to persons skilled in the art, are intended to be included within the spirit and scope of the present invention, except as further limited by the accompanying claims.

I claim:

1. A vehicle track comprising a pair of spaced-apart, endless V-belts, a plurality of gripper members provided with ground-clipping cleats on one side, and a pair of transversely spaced guide elements on the other side of each of said gripper members, said guide elements being provided with fastening means positioned wholly outside said V-belts for respectively clamping same between themselves and said gripper members with said cleats positioned on the outside of the track formed thereby, said guide elements being formed with trapezoidal channels complementary to the cross-sections of said V-belts, the latter being completely bracketed between said gripper members and said guide elements.

2. A vehicle track according to claim 1 wherein said guide elements are formed with convex clamping surfaces rolling on the inner faces of said V-belts.

3. A vehicle track according to claim 1 wherein each of said gripper members is formed with a concave, raised platform intermediate said guide elements, said platform being adapted to engage the periphery of a wheel flanked by said guide elements.

4. A vehicle track according to claim 3 wherein said platform has sidewalls formed with lateral slots, said guide elements being provided with projections removably received in said slots.

5. A vehicle track according to claim 4 wherein each of said guide elements is provided with an inner leg bearing one of said projections and with an outer leg having a bore, said gripper members having holes positioned beyond said sidewalls in alignment with said bores, further comprising fastening means removably passing through said holes and said bores for securing said guide elements to said gripper members.

6. A vehicle track comprising a pair of spaced-apart endless V-belts, a plurality of gripper members provided with ground-gripping cleats on one side, and a pair of transversely spaced guide elements on the other side of each of said gripper members, said guide elements respectively clamping said V-belts between themselves and said gripper members with said cleats positioned on the outside of the track formed thereby, each of said guide elements having an extended inner leg formed with a projection and a foreshortened outer leg provided with a bore, each of said gripper members being provided with a series of transversely spaced holes adapted respectively to receive the projections and to be aligned with the bores of the associated guide elements in a plurality of different relative positions of said guide elements, further including fastening means removably passing through said bores and through the holes aligned therewith for securing said guide elements to said gripper members.

References Cited in the file of this patent

UNITED STATES PATENTS

| | | |
|---|---|---|
| 1,501,097 | Chase | July 15, 1924 |
| 2,064,890 | Dorst | Dec. 22, 1936 |
| 2,707,658 | Grenier | May 3, 1955 |
| 2,749,189 | France et al. | June 5, 1956 |

FOREIGN PATENTS

| | | |
|---|---|---|
| 498,934 | Great Britain | Jan. 17, 1939 |